United States Patent
Lee et al.

(10) Patent No.: US 9,927,523 B2
(45) Date of Patent: Mar. 27, 2018

(54) EVENT FILTERING DEVICE AND MOTION RECOGNITION DEVICE THEREOF

(71) Applicant: SAMSUNG ELECTRONICS CO., LTD., Suwon-si (KR)

(72) Inventors: Kyoobin Lee, Seoul (KR); Hyun Surk Ryu, Hwaseong-si (KR); Jun Haeng Lee, Hwaseong-si (KR); Jun Seok Kim, Hwaseong-si (KR); Keun Joo Park, Seoul (KR); Chang Woo Shin, Hwaseong-si (KR); Joo Yeon Woo, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 391 days.

(21) Appl. No.: 14/493,807

(22) Filed: Sep. 23, 2014

(65) Prior Publication Data

US 2015/0168553 A1 Jun. 18, 2015

(30) Foreign Application Priority Data

Dec. 16, 2013 (KR) ........................ 10-2013-0156290

(51) Int. Cl.
| | |
|---|---|
| *G01S 17/58* | (2006.01) |
| *G01S 17/87* | (2006.01) |
| *G01S 17/66* | (2006.01) |
| *G01S 17/50* | (2006.01) |
| *G06K 9/00* | (2006.01) |
| *G06K 9/20* | (2006.01) |
| *G06F 3/01* | (2006.01) |

(52) U.S. Cl.
CPC .............. *G01S 17/50* (2013.01); *G06F 3/017* (2013.01); *G06K 9/00355* (2013.01); *G06K 9/2018* (2013.01)

(58) Field of Classification Search
None
See application file for complete search history.

(56) References Cited

U.S. PATENT DOCUMENTS

| | | | | |
|---|---|---|---|---|
| 4,148,587 A | * | 4/1979 | Erdmann | G01B 11/24 250/201.4 |
| 4,657,394 A | * | 4/1987 | Halioua | G01B 11/2527 250/237 G |
| 4,746,211 A | * | 5/1988 | Ruth | G01P 3/36 356/28.5 |

(Continued)

FOREIGN PATENT DOCUMENTS

| | | |
|---|---|---|
| JP | 2005-197914 A | 7/2005 |
| JP | 4265038 B2 | 5/2009 |

(Continued)

*Primary Examiner* — Mohammad J Rahman
(74) *Attorney, Agent, or Firm* — Sughrue Mion, PLLC

(57) ABSTRACT

An event filtering device and a motion recognition device using thereof are provided. The motion recognition device includes an emitter configured to emit an infrared ray in a pattern; a detector configured to detect events in a visible ray area and an infrared ray area; a filter configured to determine whether at least one portion of the detected events is detected using the infrared ray in the pattern, and filter the detected events based on a result of the determination; and a motion recognizer configured to perform motion recognition based on a detected event accepted by the filter.

20 Claims, 12 Drawing Sheets

(56) References Cited

U.S. PATENT DOCUMENTS

| | | | | |
|---|---|---|---|---|
| 5,548,418 A | * | 8/1996 | Gaynor | G02B 5/32 359/10 |
| 5,870,490 A | * | 2/1999 | Takahashi | G05B 19/37 356/613 |
| 6,101,269 A | | 8/2000 | Hunter et al. | |
| 8,390,821 B2 | | 3/2013 | Shpunt et al. | |
| 8,416,303 B2 | * | 4/2013 | Gomi | H04N 5/2254 250/339.05 |
| 2009/0096783 A1 | * | 4/2009 | Shpunt | G01B 11/25 345/419 |
| 2010/0191124 A1 | * | 7/2010 | Prokoski | A61B 5/0064 600/473 |
| 2010/0245585 A1 | * | 9/2010 | Fisher | H04M 1/6066 348/164 |
| 2010/0295781 A1 | | 11/2010 | Alameh et al. | |
| 2011/0182519 A1 | * | 7/2011 | Craddock | G01J 1/46 382/190 |
| 2012/0234631 A1 | * | 9/2012 | Hsieh | B66B 3/002 187/247 |
| 2013/0162778 A1 | * | 6/2013 | Kurokawa | G06T 7/204 348/46 |
| 2015/0350588 A1 | * | 12/2015 | Lim | H04N 5/7458 348/745 |

FOREIGN PATENT DOCUMENTS

| | | |
|---|---|---|
| KR | 10-2010-0132846 A | 12/2010 |
| KR | 10-2012-0051212 A | 5/2012 |
| KR | 10-2013-0027671 A | 3/2013 |
| KR | 10-2013-0043936 A | 5/2013 |
| KR | 10-2013-0068538 A | 6/2013 |

* cited by examiner

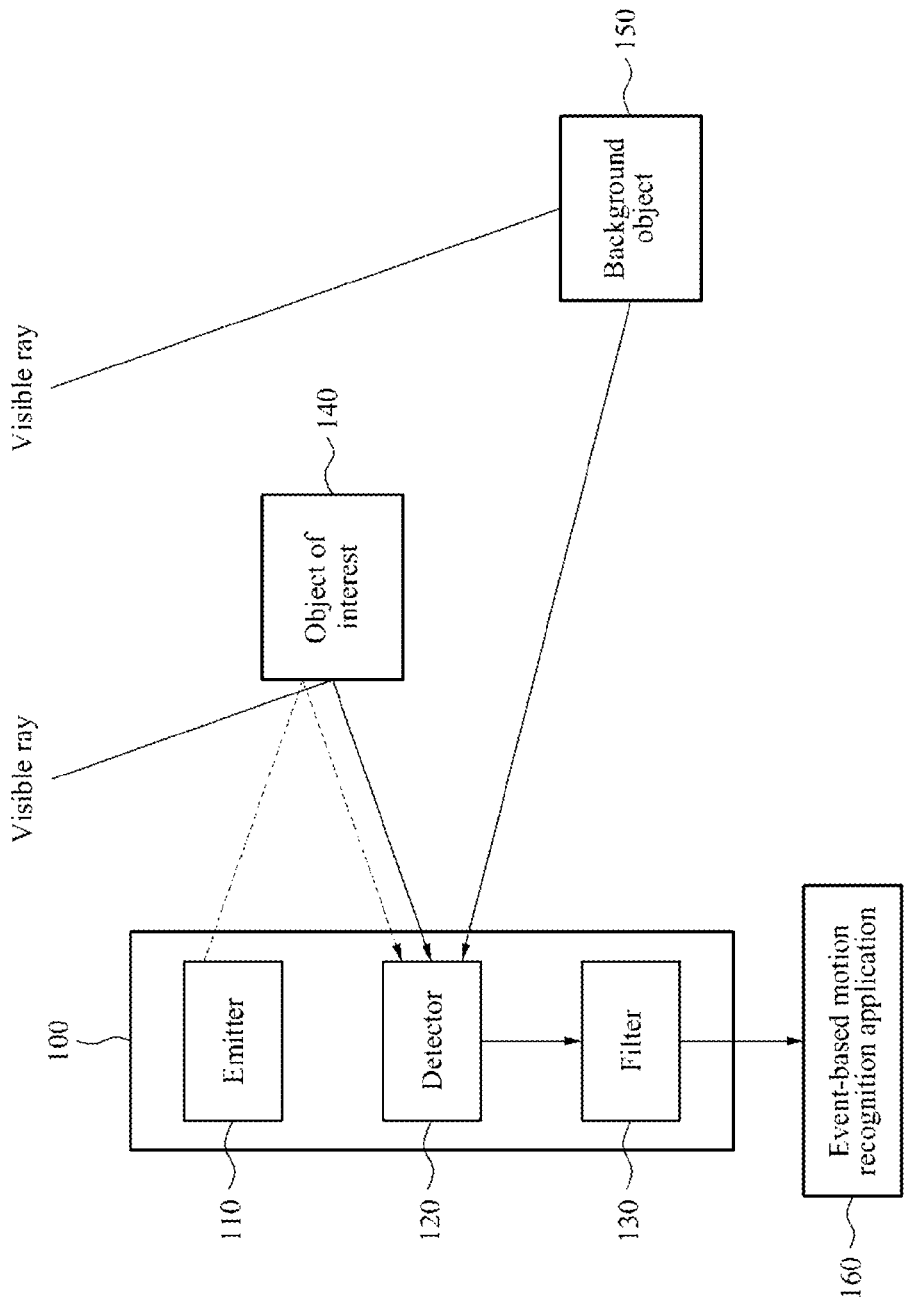

EVENT FILTERING DEVICE AND MOTION RECOGNITION DEVICE THEREOF

CROSS-REFERENCE TO RELATED APPLICATION

This application claims priority from Korean Patent Application No. 10-2013-0156290, filed on Dec. 16, 2013 in the Korean Intellectual Property Office, the disclosure of which is incorporated herein by reference in its entirety.

BACKGROUND

1. Field

Methods and apparatuses consistent with exemplary embodiments relate to an event-based motion recognition method.

2. Description of the Related Art

Human-computer interaction (HCI) may occur between people and computers through a user interface implemented on the computer. The user interface may include hardware and/or software components. For example, a user interface may use motion recognition to allow for a more natural interaction between users and computers.

SUMMARY

Exemplary embodiments may address at least the above problems and/or disadvantages and other disadvantages not described above. Also, the exemplary embodiments are not required to overcome the disadvantages described above, and an exemplary embodiment may not overcome any of the problems described above.

According to an aspect of an exemplary embodiment, there is provided a motion recognition device, the device including an emitter configured to emit an infrared ray in a pattern, a detector configured to detect events in a visible ray area and an infrared ray area, a filter configured to determine whether at least one portion of the detected events is detected using the infrared ray in the pattern, and filter the detected events based on a result of the determination, and a motion recognizer configured to perform motion recognition based on a detected event accepted by the filter.

The filter may be configured to determine whether the at least one portion of the detected events is detected using the infrared ray in the pattern by determining whether the pattern is received based on the detected events. The filter may be configured to accept the detected events in response to a determination that the at least one portion of the detected events corresponds to a spatial pattern when the pattern is the spatial pattern. The filter may be configured to accept the detected events in response to a determination that the at least one portion of the detected events includes a frequency spectrum corresponding to a temporal pattern when the pattern is the temporal pattern.

The detector may be configured to output an event signal including an index of a pixel in which the events are detected and a time stamp at which the events are detected. The filter may be configured to update a value of an element corresponding to the index and the time stamp from among a plurality of elements included in a set table based on a determination that the at least one portion of the detected events is detected using the infrared ray in the pattern. The motion recognizer may be configured to calculate an optical flow based on the set table, and perform motion recognition based on the optical flow.

According to an aspect of an exemplary embodiment, there may be provided an event filtering device, the device including an infrared ray lamp configured to emit an infrared ray in a pattern, an event-based image sensor configured to detect events based on a change in an image input from a visible ray area and an infrared ray area, and a filter configured to determine whether the pattern is received based on the detected events, and filter the detected events based on a result of the determination.

According to an aspect of an exemplary embodiment, there may be provided a motion recognition method including emitting an infrared ray in a pattern, detecting events in a visible ray area and an infrared ray area, determining whether at least one portion of the detected events is detected by the infrared ray in the pattern, filtering the detected events based on a result of the determining, and performing motion recognition based on a detected event accepted by the filtering.

BRIEF DESCRIPTION OF THE DRAWINGS

The above and other aspects will become apparent and more readily appreciated from the following detailed description of certain exemplary embodiments, taken in conjunction with the accompanying drawings of which:

FIG. 1 is a block diagram illustrating an event filtering device according to an exemplary embodiment;

DETAILED DESCRIPTION OF EXEMPLARY EMBODIMENTS

Figure 2A:
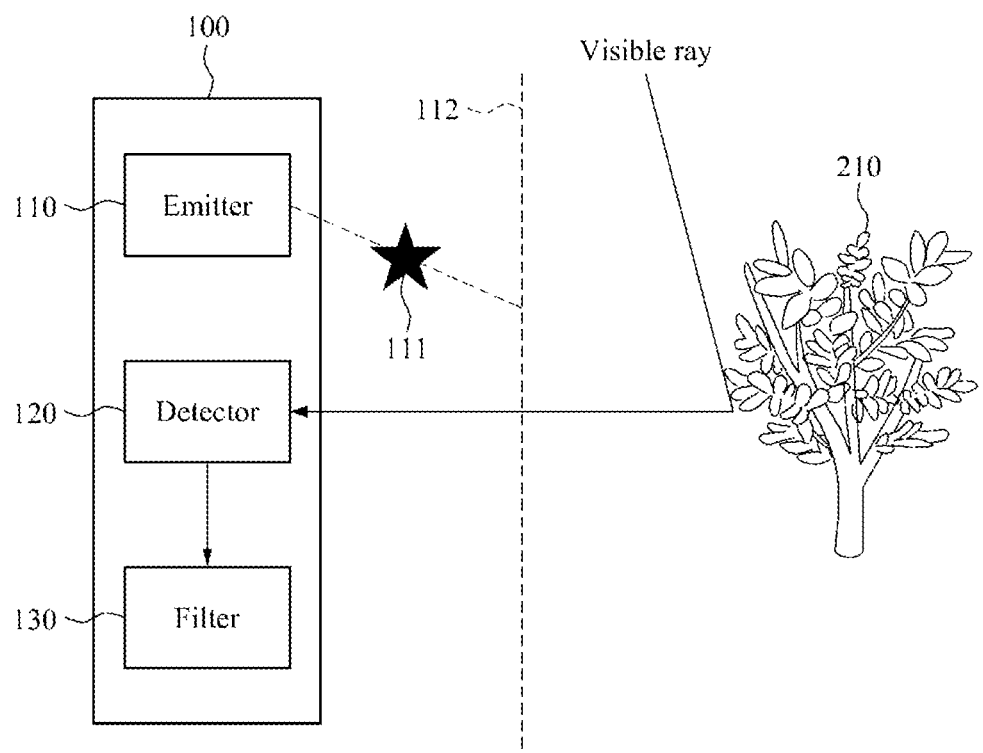
FIGS. 2A, 2B, and 2C are diagrams illustrating examples of an event filtering device according to one or more exemplary embodiments.

Reference will now be made in detail to exemplary embodiments, examples of which are illustrated in the accompanying drawings, wherein like reference numerals refer to the like elements throughout. Exemplary embodiments are described below in order to explain the exemplary embodiments by referring to the figures.

FIG. 1 is a block diagram illustrating an event filtering device 100 according to an exemplary embodiment. Referring to FIG. 1, the event filtering device 100 may enhance accuracy in motion recognition by filtering a movement of a background object using a motion recognition interface. The event filtering device 100 may detect events from a visible ray area and an infrared ray area in a dissimilar manner to event-based motion recognition methods of the related art. The event filtering device 100 may determine whether the detected events are generated by a movement of an object of interest or by a movement of a background object by detecting the events from both of the visible ray area and the infrared ray area. The event filtering device 100 may enhance accuracy of motion recognition by the motion recognition interface by filtering events related to the movement of the background object and accepting events related to the movement of the object of interest. According to another exemplary embodiment, the background object may be a secondary object that falls within the foreground relative to the object of interest within the viewing range of the image sensor which may also be called the detector. Further, there may be both a secondary object and a background object, or more objects, moving in different directions and manners, or a similar direction, while the actual background may also be moving and changing all the while the object of interest may also be in motion.

The event filtering device 100 may include an emitter 110, a detector 120, and a filter 130. The detector 120 may detect an event from the visible ray area and the infrared ray area. For example, the detector 120 may include an event-based image sensor that responds to both a visible ray and an infrared ray.

As used herein, the term "event" may refer to a movement of an object. When the object moves, a visible ray or an infrared ray reaching the detector 120 that is reflected off of the object may vary. The detector 120 may receive the visible ray and the infrared ray, and detect a change in the visible ray and in the infrared ray. For example, the detector 120 may detect an intensity change in the visible ray and an intensity change in the infrared ray. Intensity is proportional to a quantity of incident photons entering the detector 120, and therefore, the detector 120 may detect a change in the quantity of the incident photons of the visible ray area and the infrared ray area. By way of example, when a light source is substantially fixed based on a period of time elapsing and an object is not self-emitting, an incident visible ray and/or an incident infrared ray entering the detector 120 may be a visible ray and/or an infrared ray that is generated from the light source and reflected off of the non-self-emitting object. When the object is static, the incident visible ray and/or the incident infrared ray entering the detector 120 may be invariable because no substantial variations are present in the visible ray and/or the infrared ray being reflected off of the unmoving object. Conversely, when the object is in motion, the incident visible ray and/or the incident infrared ray entering the detector 120 may vary, because the visible ray and/or the infrared ray being reflected off of the moving object varies based on a movement of the moving object.

The detector 120 may detect an event by detecting a change in an image input in the visible ray area and/or the infrared ray area. The detector 120 may output an event signal asynchronously as a change in an incident visible ray and/or a change in an incident infrared ray is detected. For example, when the detector 120 detects an event where a visible ray is brightened or darkened in a predetermined pixel, the detector 120 may output an event corresponding to the predetermined pixel. When the detector 120 detects an event where an intensity of an infrared ray changes in a predetermined pixel, the detector 120 may output an event corresponding to the predetermined pixel. The detector 120 may not scan, in a frame unit, an output of a photodiode of a plurality of pixels in a dissimilar manner to a frame-based image sensor, and output pixel data in a portion having a change in a visible ray and/or an infrared ray. An event signal, for example, information asynchronously generated in response to a movement of an object and then output, may refer to information similar to an optic nerve signal transmitted in a human from a retina to a brain.

According to an exemplary embodiment, operational complexity required for motion recognition may be reduced by using the detector 120 that detects an event in a dissimilar manner to the existing frame-based image sensor. The event filtering device 100 may select and transmit an event of interest to an event-based operation recognition application 160, and provide technology for enhancing accuracy of motion recognition. Hereinafter, an operation of filtering an event by a movement of a background by detecting the event from a visible ray area and an infrared ray area will be described.

In general, the detector 120 may accept a visible ray. An incident visible ray entering the detector 120 may include a ray being reflected off of an object of interest 140 and a ray being reflected off of a background object 150. As discussed above, the detector 120 may detect an event by a movement of an object. For example, when the object of interest 140 moves, the detector 120 may detect an event with respect to the object of interest 140, and when the background object 150 moves, the detector 120 may detect an event with respect to the background object 150. When both the object of interest 140 and the background object 150 move, the detector 120 may detect an event for both of the object of interest 140 and the background object 150.

Blocking an event related to a movement of a background is used enhance accuracy of motion recognition. For example, a user may hold a smart phone providing motion recognition in one hand, and input a motion with another hand. When the user is assumed to be walking along a street, the entire input image may shake in response to the hand holding the smart phone shaking. In this example, the smart phone may recognize that the entire input image is moving. Alternatively, when the user is assumed to be sitting on a bench in a park, people may pass by behind the user. In this example, the smart phone may recognize movements of the people passing behind the user.

The event filtering device 100 may filter events by a movement of a background by using the detector 120 that detects events in a visible ray area and an infrared ray area. For example, the emitter 110 may emit an infrared ray. The infrared ray emitted by the emitter 110 may be reflected off of the object of interest 140, and enter the detector 120. Conversely, the infrared ray emitted by the emitter 110 may not reach the background object 150.

The filter 130 may determine whether at least one portion of the detected events is detected by an infrared ray, and filter the detected events. In one example, the filter 130 may accept the detected events when the at least one portion of the detected events is determined to be detected by the infrared ray. When the object of interest 140 moves, events are detected from both of the infrared ray area and the visible ray area. When the at least one portion of events is detected by the infrared ray, the filter 130 may determine that the object of interest 140 is moving and accept the detected events. The events detected from the visible ray area among the accepted events may be used for motion recognition. In another example, the filter 130 may block the detected events when all of the detected events are determined to be detected by the visible ray. When the background object 150 moves, events are detected from the visible ray area. When all of the events are detected by the visible ray, the filter 130 may determine that the object of interest 140 is not moving and block the detected events.

According to another exemplary embodiment, the detector 120 may not distinguish events detected from the visible ray area from events detected from the infrared ray area. For example, the detector 120 may output an identical signal S for both instances of detecting an event in which a visible ray changes in a time stamp T in a pixel P and detecting an event in which an infrared ray changes in the time stamp T in the pixel P. Accordingly, the emitter 110 may emit an infrared ray in a predetermined pattern to determine whether at least one portion of the events detected by the detector 120 is detected by the infrared ray.

A pattern of an infrared ray may be determined in various manners and may include such patterns as a temporal pattern, a spatial pattern, or a spatiotemporal pattern. When the temporal pattern is used, the emitter 110 may emit an infrared ray in which intensity changes to a predetermined frequency, for example, 1 kHz based on a period of time elapsing. Alternatively, the emitter 110 may emit an infrared ray in a pulse form at uniform intervals. In another exemplary embodiment, the emitter 110 may emit an infrared ray in a pulse form at predetermined intervals. When the spatial pattern is used, the emitter 110 may emit an infrared ray in a predetermined form, for example, in a shape of a star. When the spatiotemporal pattern is used, the emitter 110 may emit an infrared ray in a predetermined form by changing intensity to a predetermined frequency based on a period of time elapsing. Alternatively, the emitter 110 may emit an infrared ray in a pulse form at uniform intervals. In another exemplary embodiment, the emitter 110 may emit an infrared ray in a pulse form at non-uniform intervals, the non-uniform intervals being randomly predetermined.

The filter 130 may determine whether the at least one portion of the detected events is detected by the infrared ray in the predetermined pattern emitted by the emitter 110 by determining whether the predetermined pattern is received. In one example, referring to FIG. 2A, in an absence of movement, for example, a movement of a user, within an area of interest 112, an event may be detected in response to a tree 210 shaking due to wind behind the user. In this example, the emitter 110 may emit an infrared ray 111 in a shape of a star. However, the infrared ray 111 in the shape of the star may not reach the tree 210, or the detector 120 after being reflected off of the tree 210 within at least a predetermined period of time. In this example, the filter 130 may determine that the shape of the star is not detected from the detected events. The filter 130 may determine that the detected events are detected solely by the visible ray because the shape of the star is not detected from the detected events. The filter 130 may determine that the object of interest 140 is not moving, and block or ignore the detected events.

Figure 2B:
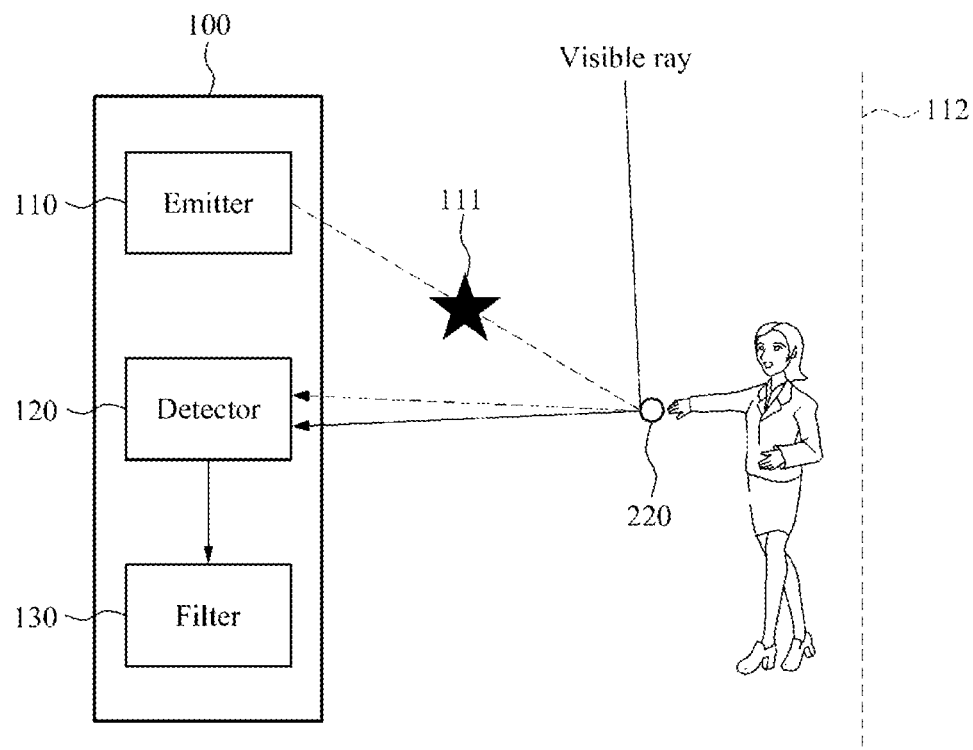

In another example, referring to FIG. 2B, events may be detected in response to a movement of a hand 220 by a user 221. The emitter 110 may emit the infrared ray 111 in the shape of the star. The infrared ray 111 in the shape of the star may be reflected off of the hand 220 of the user 221 and enter the detector 120. Here, a visible ray reflected off of the hand 220 of the user 221 may enter the detector 120 along with the infrared ray 111. In this example, the detector 120 may detect a change in intensity of the visible ray and a change in intensity of the infrared ray 111 in the shape of the star in response to the movement of the hand 220 of the user 221. The filter 130 may detect the shape of the star from the detected events. The filter 130 may determine that at least one portion of the detected events is detected by the infrared ray 111 because the shape of the star is detected from the detected events. The filter 130 may determine that the object of interest 140, which in this case is the hand 220, is moving and accept the detected events.

When the temporal pattern is used, the filter 130 may determine whether at least one portion of the detected events has a frequency spectrum corresponding to the temporal pattern. For example, when the emitter 110 emits an infrared ray in which intensity changes to 1 kHz, the filter 130 may determine whether the at least one portion of the detected events has a frequency of 1 kHz. The filter 130 may employ a band pass filter that passes signals of a 1 kHz frequency. The band pass filter may output a large signal when a signal having a great number of frequency components in a predetermined frequency band is input, and output a small signal when a signal having a small number of frequency components in a predetermined frequency band is input.

The filter 130 may determine that the at least one portion of the detected events has a corresponding frequency when the output of the band pass filter is greater than a predetermined threshold value. When the frequency spectrum corresponding to the temporal spectrum is detected from the detected events, the filter 130 may determine that the object of interest 140 is in motion, and accept the detected events. Conversely, when the frequency spectrum corresponding to the temporal spectrum is not detected from the detected events, the filter 130 may determine that the object of interest 140 is static, and block or ignore the detected events.

When the spatiotemporal pattern is used, the filter 130 may determine whether the at least one portion of the detected events has the frequency spectrum corresponding to the temporal pattern and corresponds to a form corresponding to the spatial pattern. For example, when the emitter 110 emits an infrared ray in a shape of the star in which intensity changes to 1 kHz, the filter 130 may determine whether the at least one portion of the detected events has 1 kHz frequency in the shape of the star. The filter 130 may use the band pass filter that passes signals of the 1 kHz frequency. When the form corresponding to the spatial pattern is detected from the detected events, and the detected events have the frequency spectrum corresponding to the temporal pattern, the filter 130 may determine that the object of interest 140 is in motion, and accept the detected events. Alternatively, when a frequency spectrum corresponding to a temporal pattern is detected from the detected events, and the detected portion corresponds to a form corresponding to a spatial pattern, the filter 130 may determine that the object of interest 140 is in motion, and accept the detected events. In another exemplary embodiment, the filter 130 may simultaneously detect the temporal pattern and the spatial pattern.

Conversely, when the frequency spectrum corresponding to the temporal pattern is not detected or the form corresponding to the spatial pattern is not detected from the detected events, the filter 130 may determine that the object of interest 140 is static, and block the detected events. Alternatively, when the frequency spectrum corresponding to the temporal pattern is detected from a portion differing from a portion from which the form corresponding to the spatial pattern is detected, the filter 130 may determine that the object of interest 140 is static and block the detected events.

As such, a pattern of an infrared ray emitted by the emitter 110 may be used as an infrared (IR) tag. The filter 130 may determine whether the detected events are accepted based on whether the IR tag is included in the events detected by the detector 120. The filter 130 may be referred to as an IR tag detector.

Figure 2C:
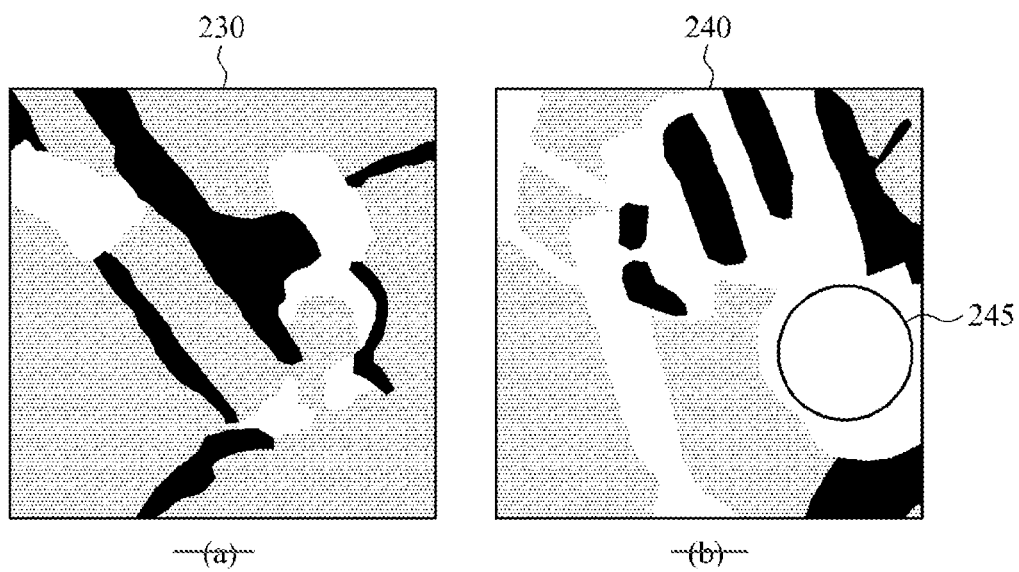

FIG. 2C illustrates an example in which a user is holding a smart phone in one hand, and inputting a motion with the other hand while gazing down at the smart phone. Referring to FIG. 2C, a first input image 230 refers to an input image in which one hand is not inputting a motion, and a second input image 240 refers to an input image in which one hand is inputting a motion. As shown in FIG. 2C, a white portion indicates an area in which an event of intensity of an infrared ray or a visible ray increasing is detected, and a black portion indicates an area in which an event of intensity of an infrared ray or a visible ray being decreasing is detected. A grey portion indicates an area absent a detected event.

In an exemplary embodiment, when an infrared ray having a frequency spectrum corresponding to a temporal pattern is emitted by an emitter, the first input image 230 may include events with respect to a face of a user detected in response to shaking of a hand holding a smart phone and a ceiling in a rear of the user. A filter may determine whether the frequency spectrum corresponding to the temporal pattern is detected from the first input image 230. The infrared ray emitted by the emitter may not reach the face of the user or the ceiling, or may not reach a detector through being reflected off of the face of the user or the ceiling within a predetermined period of time. Accordingly, the filter may determine that the frequency spectrum corresponding to the temporal pattern is not detected from the first input image 230. In this example, the filter may block a plurality of events included in the first input image 230.

In another example, when the infrared ray having the frequency spectrum corresponding to the temporal pattern is emitted by the emitter, the second input image 240 may include events with respect to a hand detected in response to a movement of the hand of the user. The filter may determine whether the frequency spectrum corresponding to the temporal pattern is detected from the second input image 240. The infrared ray emitted by the emitter may reach the detector by being reflected off of the hand of the user. An area 245 indicated in white within an area of the hand of the user in the second input image 240 may correspond to an area in which the infrared ray is reflected. The filter may detect the frequency spectrum corresponding to the temporal pattern from the area 245 of the second input image 240. For example, an output of a band pass filter may be greater than a predetermined threshold value due to the area 245 within the second input image 240. In this example, the filter may accept a plurality of events included in the second input image 240.

Although not shown in drawings, when an infrared ray having a form corresponding to a spatial pattern is emitted by the emitter, the area 245 may have the form corresponding to the spatial pattern. The filter may detect the form corresponding to the spatial pattern from the area 245.

When the infrared ray, having the frequency spectrum corresponding to the temporal pattern and having the form corresponding to the spatial pattern, is emitted by the emitter, the area 245 may have the form corresponding to the spatial pattern and the frequency spectrum corresponding to the temporal pattern. The filter may detect the output greater than the predetermined threshold value from the band pass filter, and detect the form corresponding to the spatial pattern from the area 245.

The filter 130 may manage an event map in a predetermined table structure. For example, the detector 120 may output an event signal including an index of a pixel from which an event is detected and a time stamp from which an event is detected. The filter 130 may update a value of an element corresponding to the index and the time stamp from among a plurality of elements included in the event map based on a determination that a detected event is accepted. The updated event map may be provided to the event-based motion recognition application 160.

Figure 3:
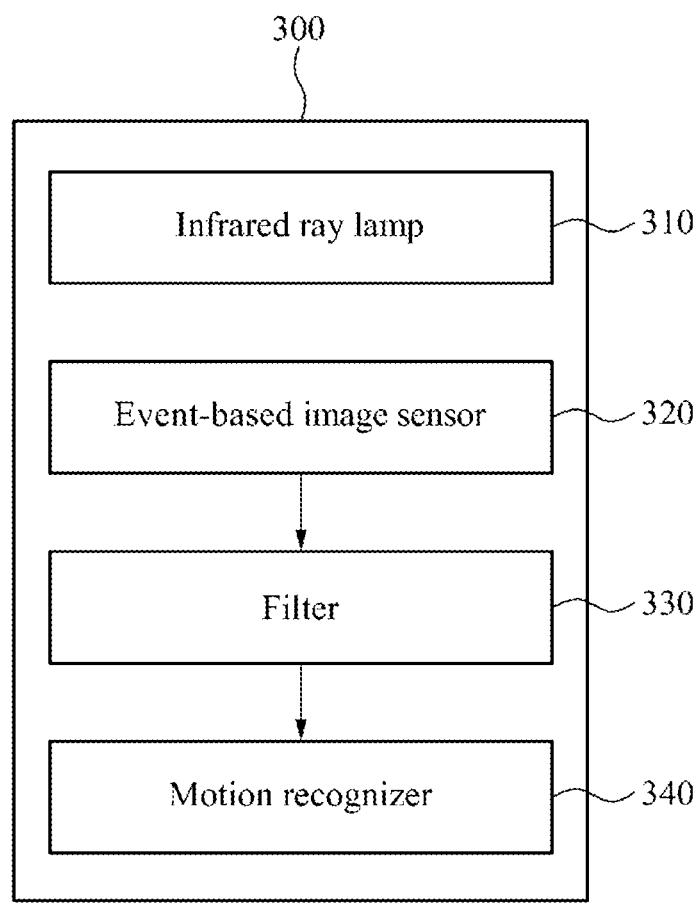
FIG. 3 is a block diagram illustrating a motion recognition device according to an exemplary embodiment.

FIG. 3 is a block diagram illustrating a motion recognition device 300 according to an exemplary embodiment. Referring to FIG. 3, the motion recognition device 300 may include an infrared ray lamp 310, an event-based image sensor 320, a filter 330, and a motion recognizer 340. The infrared ray lamp 310 may emit an infrared ray in a predetermined pattern, and the event-based image sensor 320 may detect events through a change in an input image from a visible ray area and an infrared ray area. The filter 330 may determine whether the predetermined pattern is received based on the detected events. The filter 330 may accept the detected events based on a determination indicating receipt of the predetermined pattern. Because technical features of the emitter 110, the detector 120, and the filter 130 described with reference to FIG. 1 may be directly applicable to the infrared ray lamp 310, the event-based image sensor 320, and the filter 330, further detailed description will be omitted for conciseness.

The motion recognizer 340 may perform motion recognition based on the accepted events. For example, when a multimedia playing application is assumed to be on operation, the motion recognizer 340 may suspend playing of multimedia in response to recognizing a motion of clenching a fist. Alternatively, the motion recognizer 340 may resume the playing of the multimedia in response to recognizing a motion of lifting a thumb.

The motion recognizer 340 may calculate an optical flow using an event map generated by the filter 330. The motion recognizer 340 may perform motion recognition based on the calculated optical flow. Hereinafter, examples of an event map, an optical flow, and an operation of performing motion recognition using an optical flow will be discussed with reference to FIGS. 4 through 9.

Figure 4:
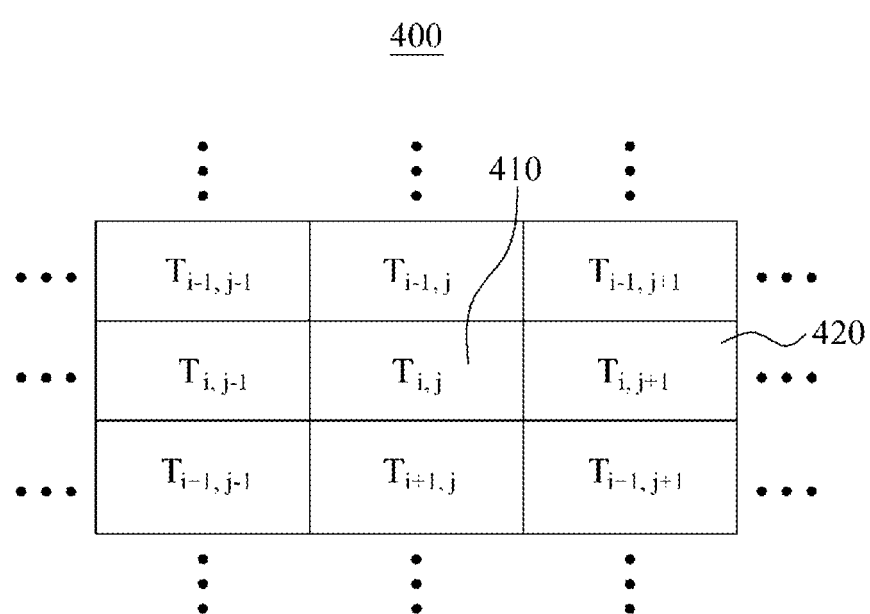
FIG. 4 is a diagram illustrating a time stamp according to an exemplary embodiment.

FIG. 4 is a diagram illustrating a time stamp according to an exemplary embodiment. Referring to FIG. 4, a motion recognition device may receive an event, and update an event map 400 based on the event. The event map 400 may include elements corresponding to a plurality of event values included in the event. Each of the elements may store a time stamp indicating a time of a most recent occurrence of an event corresponding to the each element. In an example, a time of a most recent occurrence of an event in an element 410 at (i, j) position may be $T_{i,j}$, and a time of a most recent occurrence of an event in an element 420 at (i, j+1) position may be $T_{i,j+1}$.

When the motion recognition device receives an event, the motion recognition device may update an element corresponding to an event value included in the received event. The motion recognition device may update an element corresponding to an event in lieu of updating all of the elements. For example, the motion recognition device may detect an element corresponding to an event value of an event received from among a plurality of elements included in the event map 400, and update a time stamp of the detected element to a time stamp of the received event.

The motion recognition device may store a time at which a new event occurs in a unit less than a microsecond (µ) for each of the plurality of elements. The motion recognition device may perform image processing based on information associated with an event occurring for a last time for each element, rather than based on a history of events occurring based on a period of time elapsing. The motion recognition device may provide a technology for performing image processing by using a small memory and a small quantity of operations.

Figure 5:
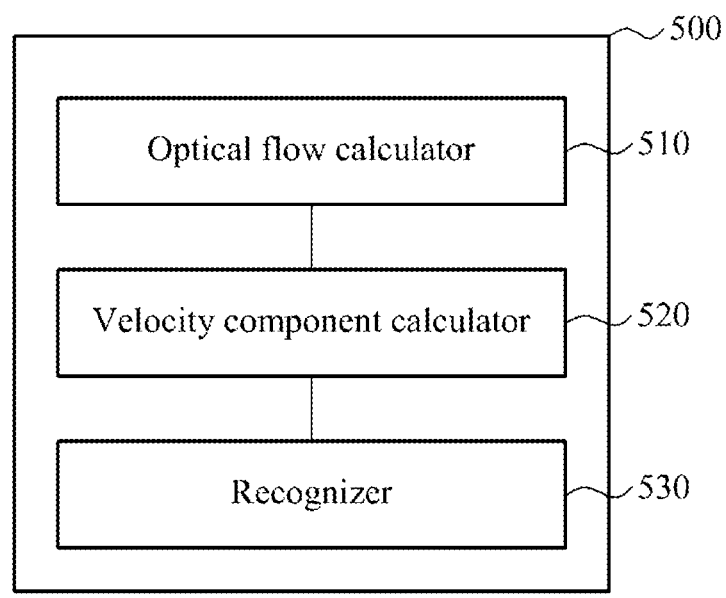
FIG. 5 is a block diagram illustrating a motion recognizer according to an exemplary embodiment.

FIG. 5 is a block diagram illustrating a motion recognizer 500 according to an exemplary embodiment. Referring to FIG. 5, the motion recognizer 500 may include an optical flow calculator 510, a velocity component calculator 520, and a recognizer 530. The optical flow calculator 510 may calculate optical flows. As used herein, the term optical flow may refer to a group of velocity vectors including information associated with a movement of shading. For example, the optical flow may include a group of velocity vectors corresponding to a plurality of events. When an object moves with respect to a camera, intensity of a plurality of pixels may change. In this instance, the optical flow may include such movement of shading in a form of a two-dimensional (2D) vector. A term "change in shading" is generally used in a visible ray area, however, may be understood as encompassing a change in shading by a visible ray and by an infrared ray. For example, an event of a photon having a wavelength of an infrared ray area increasing may be understood as an event of shading of an infrared ray being brightened, and an event of a photon having a wavelength of an infrared ray area decreasing may be understood as an event of shading of an infrared ray being darkened.

In an instance of an event-based image sensor, the plurality of elements included in the event map 400 of FIG. 4 may correspond to a plurality of pixels included in the event-based image sensor. The optical flow may be a group of 2D vectors having a predetermined direction and magnitude on a 2D plane including the plurality of pixels.

Figure 6:
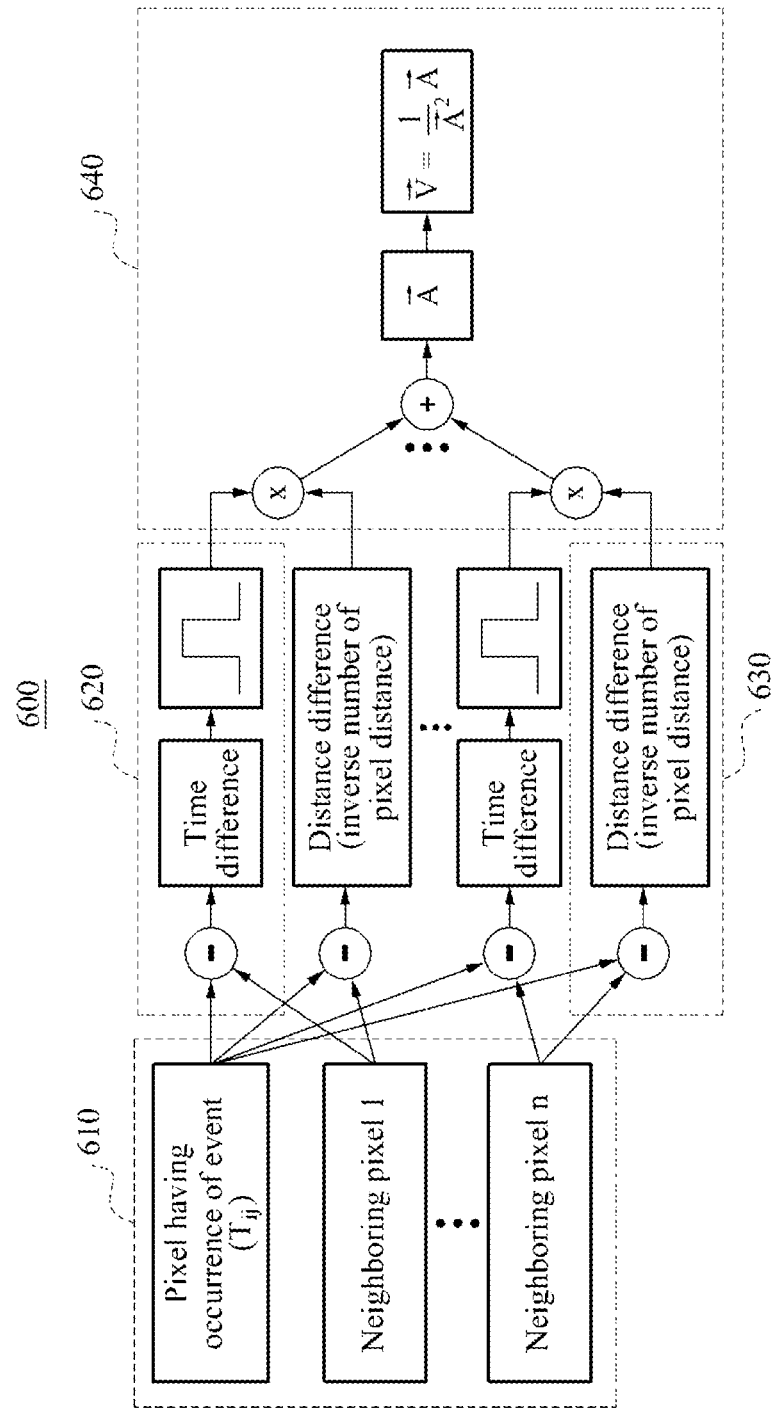
FIG. 6 is a diagram illustrating an operation of an optical flow calculator according to an exemplary embodiment.

Referring to FIG. 6, an optical flow calculator 600 may include a neighboring pixel obtainer 610, a time difference calculator 620, a distance difference calculator 630, and an optical flow calculation performer 640. A plurality of modules illustrated in FIG. 6 may be implemented by software, hardware, or a combination of software and hardware components. For example, each of the neighboring pixel obtainer 610, the time difference calculator 620, the distance difference calculator 630, and the optical flow calculation performer 640 may be implemented by a processor, a memory, a hardware accelerator (HWA), a field programmable gate array (FPGA), or a combination thereof.

The neighboring pixel obtainer 610 may obtain a plurality of neighboring pixels centering a pixel having an occurrence of an event. In one example, the neighboring pixel obtainer 610 may obtain eight neighboring pixels adjacent directly to a pixel having an occurrence of an event. In another example, the neighboring pixel obtainer 610 may further obtain sixteen neighboring pixels surrounding the eight neighboring pixels aside from the eight neighboring pixels adjacent directly to the pixel having the occurrence of the event.

The time difference calculator 620 may calculate information associated with a time difference between the pixel having the occurrence of the event and neighboring pixels based on time stamp information stored in the event map 400 of FIG. 4. For example, a new event is assumed to occur in the element 410 of FIG. 4, hereinafter also referred to as a pixel. The time difference calculator 620 may calculate a difference between the time $T_{i,j}$ stored in the pixel 410 and the time $T_{i,j+1}$ stored in the neighboring element 420, hereinafter also referred to as a pixel. In this example, $T_{i,j} - T_{i,j+1}$ may be equal to or greater than zero because the time $T_{i,j}$ stored in the pixel 410 is in a state in which a value is updated in response to the occurrence of the new event. When an event occurs simultaneously in the pixel 420, $T_{i,j} - T_{i,j+1}$ may be zero. The time difference calculator 620 may calculate the aforementioned time difference for each of the plurality of neighboring pixels obtained by the neighboring pixel obtainer 610. When the calculated time difference exceeds a predetermined window range, for example, 0.1 second, the time difference calculator 620 may determine the calculated time difference to be insignificant information and output zero in lieu of the calculated time difference.

The distance difference calculator 630 may calculate information associated with a distance difference between at least one pixel having an occurrence of an event and neighboring pixels. For example, the distance difference calculator 630 may calculate an inverse number of a pixel distance between a pixel having an occurrence of an event and neighboring pixels. In this example, the pixel distance may include a normalized distance amongst a plurality of image pixels. By way of example, a pixel distance between the pixel 410 and the pixel 420 of FIG. 4 may be "1". The distance difference calculator 630 may calculate an inverse number of a pixel distance for the plurality of neighboring pixels obtained by the neighboring pixel obtainer 610.

The optical flow calculation performer 640 may calculate an optical flow based on the information associated with the time difference calculated by the time difference calculator 620 and the information associated with the distance difference calculated by the distance difference calculator 630. For example, the optical flow calculation performer 640 may calculate a 2D vector A corresponding to a pixel having an occurrence of an event, and perform dividing of the 2D vector A by a dot product of the 2D vector A based on the information associated with the time difference and the information associated with the distance difference.

For example, the optical flow calculation performer 640 may multiply information associated with a time difference by an inverse number of a distance difference for a plurality of neighboring pixels of a pixel having an occurrence of an event. The optical flow calculation performer 640 may calculate the 2D vector A by calculating a sum of results of the multiplying corresponding to the plurality of neighboring pixels. The optical flow calculation performer 640 may calculate the 2D vector A based on Equation 1 as follows.

[Equation 1]

$$\vec{A} = \vec{d} \cdot \Delta t \frac{1}{\|\vec{d}\|^2}$$

In Equation 1, $\Delta t$ denotes information associated with a time difference, and 2D vector d denotes information associated with a distance difference. As used herein, a unit of the 2D vector A may be "time/distance". The optical flow calculation performer 640 may calculate a velocity vector V included in the optical flow by dividing the 2D vector A by the dot product of the 2D vector A. As used herein, a unit of the velocity vector V may be "distance/time". The optical flow calculation performer 640 may generate an optical flow including a velocity vector for a plurality of pixels having an occurrence of an event by calculating the velocity vector V for the plurality of pixels.

The optical flow calculator 600 may remove a factor likely to serve as noise with respect to the velocity vector for the plurality of pixels included in the optical flow. As discussed above, the time difference calculator 620 may output zero when a time difference between a pixel having an occurrence of an event and a neighboring pixel exceeds a predetermined window range. When time differences between the pixel having the occurrence of the event and all of the neighboring pixels exceed the predetermined window range, the 2D vector A calculated by the optical flow calculation performer 640 may be zero. In this example, the optical flow calculation performer 640 may output zero in lieu of an infinite value calculated to be a value of the velocity vector V. Hereinafter, an operation of the velocity component calculator 520 will be described with reference to FIG. 7.

Figure 7:
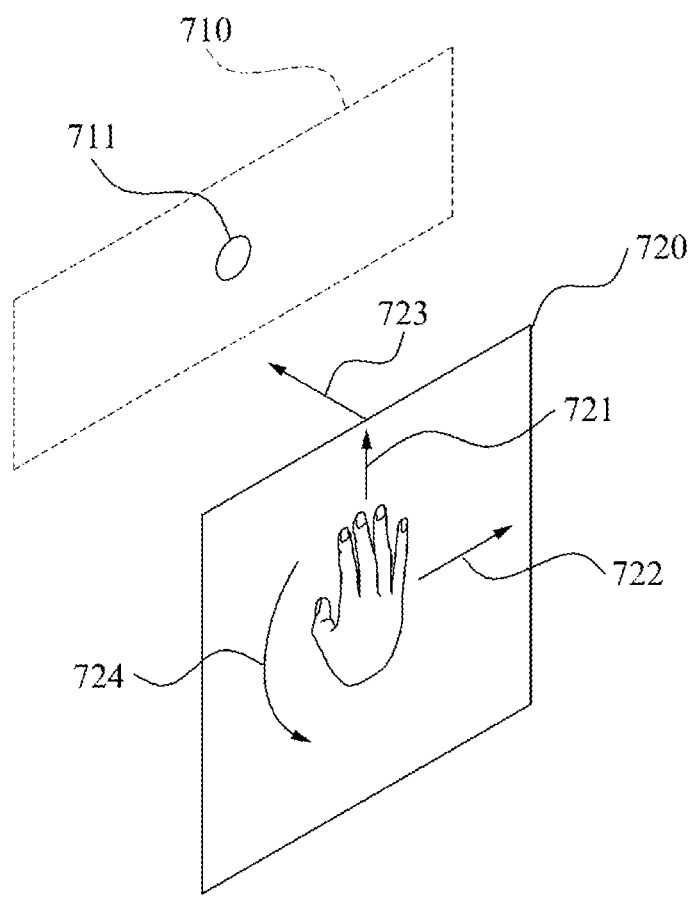
FIG. 7 is a diagram illustrating velocity components according to an exemplary embodiment.

Referring to FIG. 7, velocity components may include a first velocity component Vx in which an object moves in an x axis direction 722, a second velocity component Vy in which an object moves in a y axis direction 721, a third velocity component Vz in which an object moves in a direction 723 vertical to a plane 720, or a fourth velocity component w in which an object rotates in a counter-clockwise direction 724 on the plane 720 parallel to a sensor plane 710.

The velocity component calculator 520 may include a plane velocity calculator, an optical flow center calculator, a Z axis velocity calculator, and an angular velocity calculator. The plane velocity calculator may calculate the first velocity component Vx and the second velocity component Vy based on the optical flow. For example, the plane velocity calculator may calculate an average of the optical flow to calculate the first velocity component Vx and the second velocity component Vy.

As discussed above, the optical flow may include a velocity vector of a pixel having an occurrence of an event. The plane velocity calculator may calculate the average of the optical flow by calculating a sum of velocity vectors of all pixels. The average of the optical flow may be a 2D vector because a velocity vector for each of the pixels is a 2D vector. The plane velocity calculator may separate an x axis component from a y axis component in the calculated average of the optical flow, and calculate the first velocity component Vx and the second velocity component Vy.

Here, an IR tag may not influence the average of the optical flow. For example, the IR tag may not generate an optical flow. By way of example, a hand of a user may move toward a right side from a left side in a state in which a motion recognition device is fixed. A visible ray reaches an entire hand and a background, and therefore an event by a change in the visible ray may occur based on a path and a direction of the hand of the user. An infrared ray emitted by an emitter may reach a portion of the hand of the user in a predetermined pattern, in lieu of reaching the entire hand of the user. In this example, a portion at which the IR tag is detected may move to a portion of an index finger from a portion of a little finger as the hand of the user moves. However, the movement is relative within an area of the hand of the user, and an absolute position of the portion at which the IR tag is detected may not be fixed in an image detected by a detector. Accordingly, an optical flow for a plurality of pixels configuring the IR tag may be offset when the average of the optical flow is calculated. As a result, a movement of an object of interest may be analyzed based on remaining events aside from the IR tag absent additional processing. In a similar exemplary embodiment, velocity components to be described later may be analyzed based on remaining events aside from an IR tag.

The optical center calculator may calculate a center of an optical flow based on the optical flow. For example, the optical flow center calculator may calculate a center of gravity using a position of a pixel having an occurrence of an event and a magnitude of a velocity vector of the corresponding pixel included in the optical flow in order to calculate the center of the optical flow.

Figure 8:
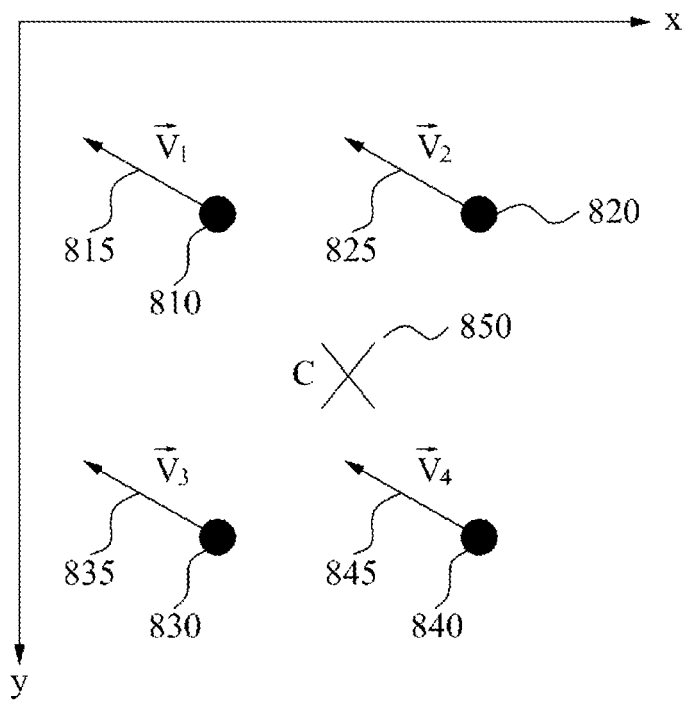
FIG. 8 is a diagram illustrating an operation of calculating an optical flow center according to an exemplary embodiment.

For example, referring to FIG. 8, when pixels having an occurrence of an event are a pixel 810, a pixel 820, a pixel 830, and a pixel 840, an optical flow generated by an optical flow generator may include a velocity vector $V_1$ 815, a velocity vector $V_2$ 825, a velocity vector $V_3$ 835, and a velocity vector $V_4$ 845 corresponding to the pixel 810, the pixel 820, the pixel 830, and the pixel 840, respectively. The optical flow center calculator may calculate a center c 850 of an optical flow by applying a position, for example indicated by coordinates of an x pixel and a y pixel, for each of the pixel 810, the pixel 820, the pixel 830, and the pixel 840 and a magnitude, for example indicated by a magnitude of an x axis direction and a magnitude of a y axis direction, for each of the velocity vector $V_1$ 815, the velocity vector $V_2$ 825, the velocity vector $V_3$ 835, and the velocity vector $V_4$ 845 to Equation 2 as follows.

$$c = \left( \frac{\sum_i |V_{xi}| x_i}{\sum_i |V_{xi}|}, \frac{\sum_i |V_{yi}| y_i}{\sum_i |V_{yi}|} \right) \quad \text{[Equation 2]}$$

A Z axis velocity calculator may calculate a third velocity component Vz based on an optical flow and an optical flow center. For example, the Z axis velocity calculator may generate a relative position vector corresponding to a pixel having an occurrence of an event using a position and an optical flow center of the pixel. The Z axis velocity calculator may calculate the third velocity component Vz by performing dot product operation using a velocity vector and the relative position vector of the pixel.

Figure 9:
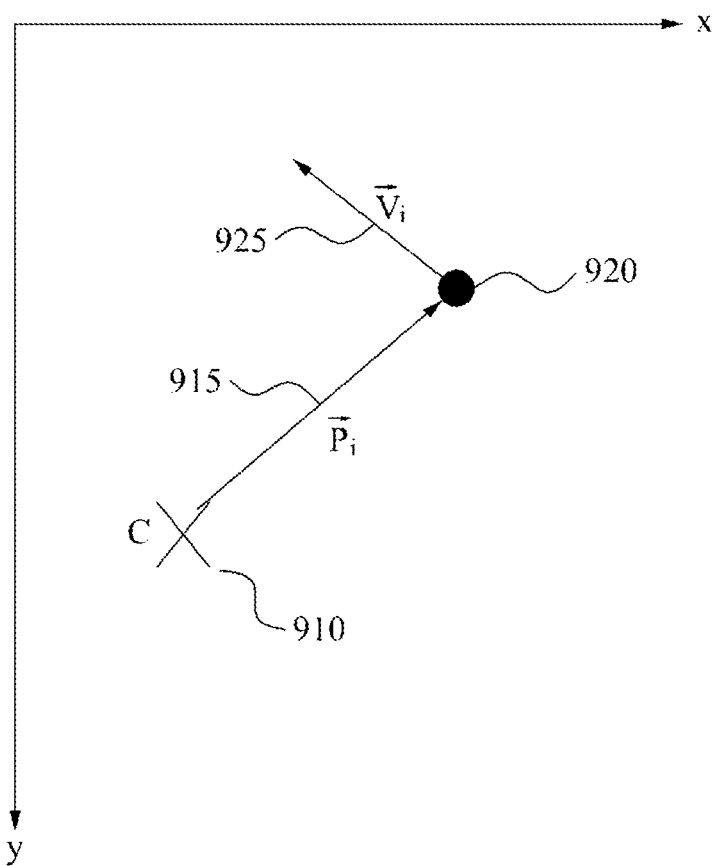
FIG. 9 is a diagram illustrating an operation of calculating a Z axis velocity and an angular velocity according to an exemplary embodiment.

For example, referring to FIG. 9, a center c 910 indicates a center of an optical flow calculated by an optical flow center calculator, and an i-th pixel corresponds to a pixel 920 from among pixels having an occurrence of an event. The Z axis velocity calculator may generate a relative position vector 915 using a position of the pixel 910 and a position of the pixel 920. The Z axis velocity calculator may calculate a third velocity component Vz by applying the relative position vector 915 and a velocity vector 925 of the i-th pixel to Equation 3 as follows.

$$V_z = \sum_i \vec{p}_i \cdot \vec{V}_i \quad \text{[Equation 3]}$$

Referring to FIG. 7, when an object is moving in the direction 723 towards the sensor 711, Vz calculated by a Z axis velocity calculator may have a positive value. Conversely, when the object is moving away from the sensor 711, Vz may have a negative value.

An angular velocity calculator may calculate a fourth velocity component w based on an optical flow and an optical flow center. For example, the angular velocity calculator may generate a relative position vector corresponding to a pixel having an occurrence of an event using a position of the pixel and the optical flow center. The angular velocity calculator may calculate the fourth velocity component w by performing a cross product operation using a velocity vector of the pixel included in the optical flow and the relative position vector.

For example, referring to FIG. 9, the center c 910 indicates a center of an optical flow calculated by the optical flow center calculator, and an i-th pixel corresponds to the pixel 920 from among pixels having an occurrence of an event. The angular velocity calculator may generate the relative position vector 915 using the position of the pixel 910 and the position of the pixel 920. The angular velocity calculator may calculate the fourth velocity component w by applying the relative position vector 915, and the velocity vector 925 of the i-th pixel to Equation 4 as follows.

$$\omega = \sum_i \vec{p}_i \times \vec{V}_i \qquad [\text{Equation 4}]$$

Referring to FIG. 7, when an object rotates in the counter-clockwise direction 724, w calculated by the angular velocity calculator may have a positive value. Conversely, when the object rotates in a clockwise direction, w calculated by the angular velocity calculator may have a negative value.

Referring to FIG. 5, the recognizer 530 may recognize an input from a user by analyzing a plurality of velocity components. The recognizer 530 may analyze the plurality of velocity components in various manners. For one example, the recognizer 530 may analyze the plurality of velocity components based on a user input context. The user input context may include a type of applications currently being operated, stored history information, sensor information, and peripheral equipment information. The recognizer 530 may provide a user custom-made motion recognition technology by performing user input processing differing based on the user input context on identical velocity components. For example, the recognizer 530 may recognize an identical motion of the user as a different command based on an application being operated. For example, when a car game application is on operation, the recognizer 530 may recognize a motion A as a command of steering a handle of a user vehicle in a counter-clockwise direction. Conversely, when an image editing application is on operation, the recognizer 530 may recognize the motion A as a command of rewinding multimedia content that is playing the motion A.

Figure 10:
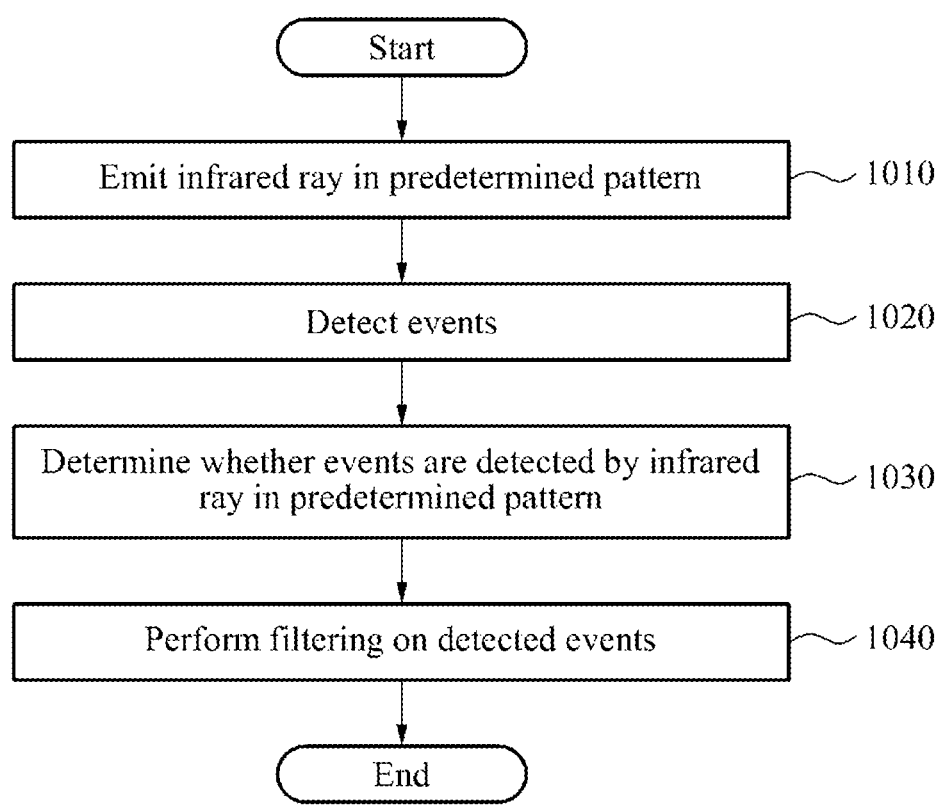
FIG. 10 is a flowchart illustrating an event filtering method according to an exemplary embodiment.

FIG. 10 is a flowchart illustrating an event filtering method according to an exemplary embodiment. Referring to FIG. 10, the event filtering method may include emitting an infrared ray (1010), detecting an event (1020), determining whether at least one portion of events is detected by an infrared ray (1030), and filtering the detected events (1040). In operation 1010, an infrared ray in a predetermined pattern may be emitted. In operation 1020, events may be detected from a visible ray area and an infrared ray area. In operation 1030, whether at least one portion of the detected events is detected by the infrared ray in the predetermined pattern may be determined. In operation 1040, the events detected based on a result of the determination may be filtered. Because technical features described with reference to FIGS. 1 through 9 may be directly applicable to each operation described in FIG. 10, a detailed description will be omitted for conciseness.

The units described herein may be implemented using hardware components, software components, or a combination thereof. For example, a processing device may be implemented using one or more general-purpose or special purpose computers, such as, for example, a processor, a controller and an arithmetic logic unit (ALU), a digital signal processor, a microcomputer, a field programmable array (FPA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The above-described exemplary embodiments may be recorded in non-transitory computer-readable media including program instructions which are executed by a computer to perform various operations. The media may also include, alone or in combination with the program instructions, data files, data structures, and the like. The program instructions recorded on the media may be those specially designed and constructed for the purposes of the exemplary embodiments, or they may be of the well-known kind and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. The media may be transfer media such as optical lines, metal lines, or waveguides including a carrier wave for transmitting a signal designating the program command and the data construction. Examples of program instructions include both machine code, such as code produced by a compiler, and files containing higher level code that may be executed by the computer using an interpreter. The described hardware devices may be configured to act as one or more software modules in order to perform the operations of the above-described exemplary embodiments, or vice versa.

Although a few exemplary embodiments have been shown and described, the present inventive concept is not limited thereto. Instead, it will be appreciated by those skilled in the art that changes may be made to these exemplary embodiments without departing from the principles and spirit of the disclosure, the scope of which is defined by the claims and their equivalents.

What is claimed is:

1. A motion recognition device comprising:
an emitter configured to emit an infrared ray in a pattern;
a detector configured to detect events in a visible ray area and an infrared ray area;
a filter configured to determine whether at least one portion of the detected events is detected by using the infrared ray emitted in the pattern, and to ignore or accept the detected events based on a determination result; and
a motion recognizer configured to perform motion recognition based on the detected events accepted by the filter,
wherein the filter is further configured to ignore a first detected event when the first detected event is not detected by using the infrared ray emitted in the pattern, and to accept a second detected event when at least one portion of the second detected event is detected by using the infrared ray emitted in the pattern, and wherein the first detected event ignored by the filter is blocked such that the motion recognizer performs the motion recognition based only on the second detected event accepted by the filter without the first detected event ignored by the filter.

2. The motion recognition device of claim 1, wherein the filter is further configured to determine whether the at least one portion of the detected events is detected by using the infrared ray emitted in the pattern by determining whether the pattern is received based on the detected events.

3. The motion recognition device of claim 1, wherein the detector is further configured to detect the events by detecting a change in an image input in at least one from among the visible ray area and the infrared ray area.

4. The motion recognition device of claim 1, wherein the events comprise an event of an object moving in a detection area.

5. The motion recognition device of claim 1, wherein the pattern comprises at least one of a temporal pattern, a spatial pattern, and a spatiotemporal pattern.

6. The motion recognition device of claim 1, wherein the filter is configured to accept the detected events in response to a determination that the at least one portion of the detected events corresponds to a spatial pattern when the pattern is the spatial pattern.

7. The motion recognition device of claim 1, wherein the filter is configured to accept the detected events in response to a determination that the at least one portion of the detected events comprises a frequency spectrum corresponding to a temporal pattern when the pattern is the temporal pattern.

8. The motion recognition device of claim 1, wherein the filter is configured to accept the detected events in response to a determination that the at least one portion of the detected events comprises a frequency spectrum corresponding to a temporal pattern and the at least one portion of the detected events corresponds to a spatial pattern, when the pattern is a spatiotemporal pattern that comprises the temporal pattern and the spatial pattern.

9. The motion recognition device of claim 1, wherein the detector is configured to output an event signal including an index of a pixel in which the events are detected and a time stamp at which the events are detected.

10. The motion recognition device of claim 9, wherein the filter is configured to update a value of an element corresponding to the index and the time stamp from among a plurality of elements included in a set table based on the determination result being that the at least one portion of the detected events is detected using the infrared ray in the pattern.

11. The motion recognition device of claim 10, wherein the motion recognizer is configured to calculate an optical flow based on the set table, and perform the motion recognition based on the optical flow.

12. An event filtering device comprising:
an infrared ray lamp configured to emit an infrared ray in a pattern;
an event-based image sensor configured to detect events based on a change in an image input from a visible ray area and an infrared ray area; and
a filter configured to determine whether the pattern of the emitted infrared ray is received based on the detected events, and to ignore or accept the detected events based on a determination result,
wherein the filter is further configured to ignore a first detected event when the pattern of the emitted infrared ray is not received based on the first detected event, and to accept a second detected event when the pattern of the emitted infrared ray is received based on the second detected event, and wherein the first detected event ignored by the filter is blocked such that motion recognition is performed based only on the second detected event accepted by the filter without the first detected event ignored by the filter.

13. The event filtering device of claim 12, wherein the filter is configured to accept the detected events in response a determination that at least one portion of the detected events corresponds to a spatial pattern when the pattern is the spatial pattern.

14. The event filtering device of claim 12, wherein the filter is configured to accept the detected events in response to a determination that at least one portion of the detected events comprises a frequency spectrum corresponding to a temporal pattern when the pattern is the temporal pattern.

15. The event filtering device of claim 12, wherein the filter is configured to accept the detected events in response to a determination that at least one portion of the detected events comprises a frequency spectrum corresponding to a temporal pattern, and the at least one portion of the detected events corresponds to a spatial pattern, when the pattern is a spatiotemporal pattern that comprises the temporal pattern and the spatial pattern.

16. The event filtering device of claim 12, wherein the event-based image sensor is configured to output an event signal including an index of a pixel in which the events are detected and a time stamp at which the events are detected.

17. The event filtering device of claim 16, wherein the filter is configured to update a value of an element corresponding to the index and the time stamp from among a plurality of elements included in a set table based on a determination that at least one portion of the detected events is detected using the infrared ray in the pattern.

18. A motion recognition method comprising:
emitting an infrared ray in a pattern;
detecting events in a visible ray area and an infrared ray area;
determining whether at least one portion of the detected events is detected by using the emitted infrared ray in the pattern;
ignoring a first detected event among the detected events when the first detected event is not detected by using the infrared ray emitted in the pattern;
accepting a second detected event among the detected events when at least one portion of the second detected event is detected by using the infrared ray emitted in the pattern; and
performing motion recognition by blocking the first detected event such that the motion recognition is performed based only on the second detected event without the first detected event.

19. The motion recognition method of claim 18, wherein the determining comprises:
determining whether the pattern is received based on the detected events; and
accepting the detected events based on the determining indicating receipt of the pattern.

20. A non-transitory computer-readable recording medium which stores a program that is executable by a computer to perform the motion recognition method of claim 18.

* * * * *